April 7, 1970          R. L. COHEN          3,505,640

AIRCRAFT FLIGHT POSITION DISPLAY INSTRUMENT

Filed May 9, 1966          3 Sheets-Sheet 1

INVENTOR.
RICHARD L. COHEN
BY Herbert L. Davis

ATTORNEY

April 7, 1970 R. L. COHEN 3,505,640
AIRCRAFT FLIGHT POSITION DISPLAY INSTRUMENT
Filed May 9, 1966 3 Sheets-Sheet 3

INVENTOR.
RICHARD L. COHEN
BY Herbert L. Davis
ATTORNEY

United States Patent Office 3,505,640
Patented Apr. 7, 1970

3,505,640
AIRCRAFT FLIGHT POSITION DISPLAY
INSTRUMENT
Richard L. Cohen, Old Bridge, N.J., assignor to The
Bendix Corporation, a corporation of Delaware
Filed May 9, 1966, Ser. No. 548,550
Int. Cl. G08g 1/12
U.S. Cl. 340—24
15 Claims

ABSTRACT OF THE DISCLOSURE

An aircraft instrument for providing a pictorial display of a position of the aircraft in flight in relation to its destination and a signal transmitting facility by the utilization of dual rotational means including a pair of slotted discs operable by a control means for receiving signals indicative of a position of the aircraft in flight from the facility for transmitting such signals, one of the discs having a radial slot and the other of the discs having an Archimedean spiraled slot, and the discs being rotationally positioned by the control means so as to project on to a display plate and through the slots in the discs a beam of light laterally movable with the flight position of the aircraft in relation to the signal transmitting facility.

---

This invention relates generally to a means for building a pictorial display within an aircraft without the conventional use of wires, pulleys, and limit stops, and more particularly to a pictorial display system within an aircraft utilizing a computer system, receiving distance and bearing signals from a VORTAC facility and presenting this information in a manner showing the position of the aircraft and the desired destination as a red and blue dot, respectively, relative to a VORTAC facility as the center of the display.

The invention is designed to be applied to conventional aircraft instrumentation of the type that provides range and bearing information from a fixed ground radio station such as a facility of either the military TACAN (Tactical Air Navigation) System or of what is proposed to be the primary commercial air navigation system of the United States popularly known as VORTAC from the fact that it transmits VOR (VHF Omni-Directional Range) bearing signals and uses the distance measuring equipment of the TACAN System for range signals.

Heretofore it has been the practice to utilize location indicating devices having discs with slots whereby an illuminated spot is determined by the position of the aircraft with respect to two radiating beacons. Another method was using plate positioning means for positioning a light beam with projector means adapted to provide true images on a map.

It should be noted that the heretofore methods of producing pictorial display had the disadvantages in continuously necessitating the need for limit stops, wires and pulleys. Other disadvantages of these heretofore devices were that the mechanisms for building the pictorial display were complex, utilized large packaging configuration, and presented the additional problem of backlash within the mechanisms' gears.

The present invention provides for a pictorial display having two movable dots each of which is positioned according to its bearing and distance from a center reference. This invention in particular provides for an aircraft as a dot of one color and a desired destination station as a dot of a complementary color, to indicate the relation thereof to a VORTAC station as the center reference. The complementary color is such as to act as a cutoff filter to the light transmitted by the first color.

It should be noted that the bearing and distance inputs for the aircraft dot of one color, such as red for example, came from a VOR (Very High Frequency Omni-Directional Range) receiver and a DME TACAN (Distance Measuring Equipment Tacan) receiver, respectively. The bearing and distance inputs for the destination dot of a complementary color, such as blue, are supplied by a control head and a course line computer which transmits this information to the pictorial display. There are four inputs within this system, two bearings and two distances, which are servo repeated to give the desired pictorial display.

Mechanically the system operates with four discs, two discs having radially extending clear areas or slots and two discs having Archimedean spiraled clear areas or slots. These discs are rotated by the bearing and range information received from the VOR receiver and the DME TACAN receiver.

Therefore, the purpose of this invention is to provide a pictorial position display indicating to the pilot the position of the aircraft in relation to its destination by utilizing a unique arrangement which is far simpler than the heretofore pictorial positioning display apparatus.

An object of this invention is to provide a pictorial display operable by a mechanism having servos for continuously rotating and controlling the pictorial display vehicle precluding the need for limit stops, wires and pulleys.

Another object of this invention is to provide a pictorial display for indicating to the pilot the position of the aircraft in relation to its destination which is simpler in design, permitting smaller packaging, and is more reliable in aiding the pilot's navigation by more precisely indicating to the pilot the position of the aircraft in relation to its destination.

A further object of this invention is to provide an improved display apparatus for converting range and bearing of an aircraft relative to its destination by utilizing a dual rotational means capable of producing a lateral movement by utilizing radial slots in combination with Archimedean spiraled slots.

These and other objects and features of the invention are pointed out in the following description in terms of the embodiment thereof which is shown in the accompanying drawings. It is to be understood, however, that the drawings are for the purpose of illustration only and are not a definition of the limits of the invention, reference being had to the appended claims for this purpose.

Figure 1:
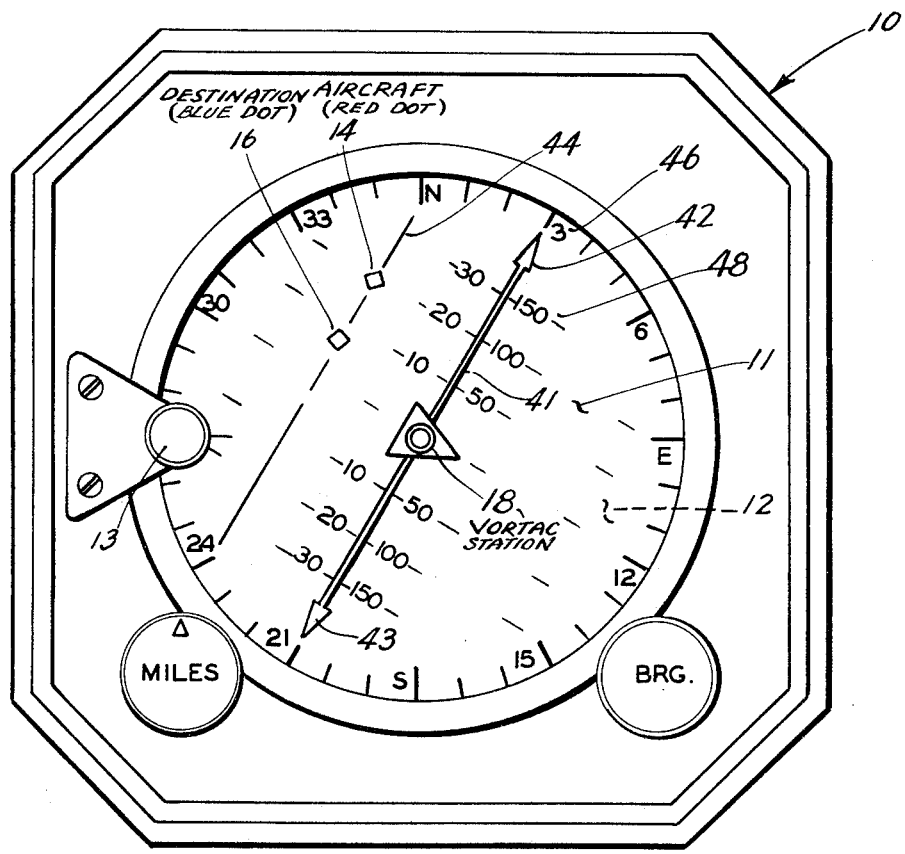
FIGURE 1 is a front view of the pictorial display device showing the two dots designating the aircraft's location relative to its destination location and in relation to a VORTAC station as the center reference, in accordance with an embodiment of this invention.

Referring to the drawings in detail, the embodiment of this invention primarily provides for a case 10 and a round pictorial display faceplate 12 over which there is mounted a transparent glass cover 11 closing the front end of the case 10 and through which there may be viewed the display faceplate 12. The glass cover 11 may be angularly positioned in the case 10 by adjustment of a conventional type operator-operative knob 13 so as to angularly position suitable indicia on the glass cover 11 in relation to indicia on the display faceplate 12, as hereinafter explained.

Further, there may be viewed through the glass cover 11 two dots displayed on the faceplate 12, i.e., a red dot 14 and a blue dot 16, each of which is positioned according to its bearing and distance from a center reference or indicia 18 which may be engraved on the glass cover 11. The pictorial display in particular shows an aircraft as the red dot 14 and a desired destination dot as the blue dot 16 relative to a VORTAC station as the center reference or indicia 18.

The movement of the aircraft red dot 14 and the desired destination blue dot 16 are animated on the surface of the faceplate 12 by servo actuated rotation of a pair of discs 20 and 22 having thin radially extending clear areas or slots 24 and 26, respectively, and a pair of discs 28 and 30 having thin Archimedean spiral clear areas or slots 32 and 34, respectively.

The four discs 20, 28, 22 and 30 are made of transparent material, the discs 20 and 28 are destination discs made of a colored transparent material, such as a red filter material, and the discs 22 and 30 are aircraft discs made of a complementary colored transparent material, such as a blue filter material.

The discs 20, 22, 28 and 30 have complementary colors which act as cutoff filters, except where the clear areas of the slots intersect. Further, the two discs 20 and 22 are bearing discs and the two discs 28 and 30 are distance discs. In addition the four discs, two bearing discs 20 and 22, and two distance discs 28 and 30 are servo actuated by electronic computer system equipment within the aircraft. The electronic computer equipment is operable within transmission range of a VORTAC station to feed the servosystems for driving the discs and thereby give the desired pictorial display on the faceplate 12.

The bearing and distance inputs for the aircraft indicator of one color or red dot 14 comes from a VOR receiver 36 and a DME receiver 38, respectively. The bearing and distance inputs for the destination indicator of a complementary color or blue dot 16 are supplied by a control head and a course line computer 40, shown separately in FIGURE 2 as 40A and 40B. These inputs are servoed to give the desired display.

The pictorial display is available with easily removable maps or charts for terminal navigation or holding pattern retention. Display maps in sizes of three inches or larger with multiple scale factors are available in console or panel mounted configurations.

The bearing of the aircraft in relation to the destination is obtained by first angularly adjusting the glass cover 11 in the case 10 so as to position a reference line 41 which may be engraved on the glass cover 11 in relation to the faceplate 12 which is viewed therethrough until the reference line 41 is positioned in a parallel relation to an imaginary line 44 wich extends through the aircraft red dot 14 and the destination blue dot 16 appearing on the faceplate 12 and viewed through the glass cover 11. The line 44 thus extends parallel to the direction of the reference line 41. The reference line 41 has at opposite ends thereof pointers 42 and 43 engraved on the glass cover 11 and which are arranged so as to cooperate with suitable indicia or a fixed bearing scale 46 at the circumference so that upon suitable adjustment of the glass cover 11 and thereby the reference line 41 the bearing of the aircraft as indicated by the red dot 14 in relation to the destination as indicated by the blue dot 16 may be read on the bearing scale 46.

Further, the distance of the aircraft indicated by the red dot 14 from the destination as indicated by the blue dot 16 may be read against a graduated distance scale 48 engraved on the glass cover 11 adjacent the reference pointer 41. The pictorial display dots 14 and 16 on the faceplate 12 may be visually compared to the reference line 41 and indicia 48 on the glass cover 11 while the pointers 42 and 43 may serve to cooperate with the indicia 46 on the faceplate 12 as a check on the control head and computer, or these indications may be used when the computer is not operating and as a visual check of the flight condition of the aircraft indicated by the red dot 14.

The faceplate 12 is transparent and is arranged for receiving therethrough the projected images of the aircraft red dot 14 and the destination blue dot 16 formed by the relative angular position of the four transparent discs, 30, 22, 28 and 20, which dots are in turn viewed through the glass cover 11.

Figure 2:
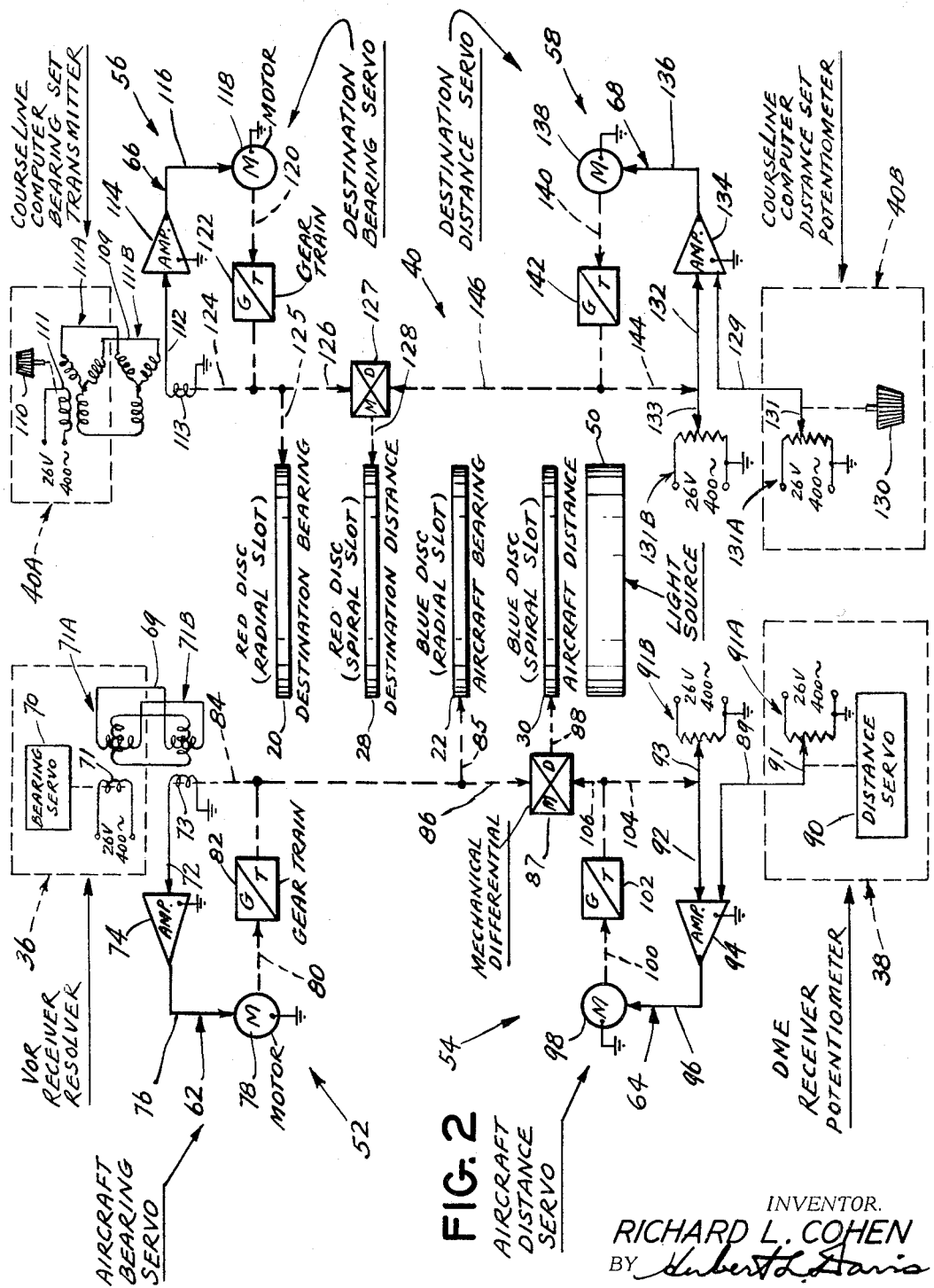
FIGURE 2 is a block diagram showing the electrical and mechanical interconnection of the invention of FIGURE 1.
Figure 3:
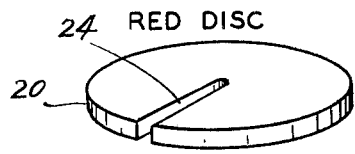
FIGURE 3 is a perspective view of a first disc of the pictorial display.

More specifically, referring to FIGURES 3 to 11 of the drawing, in order to produce the desired display on the faceplate 12, shown in FIGURE 1, there is provided a light projection means which includes the faceplate 12 receiving the projection of the aircraft red dot 14 and the distance blue dot 16 by an illuminating element or light source 50, housing a plurality of electrical lamps 60, directing white light through the four transparent discs 22, 30, 20 and 28 which are positioned by electromechanical servo systems 52, 54, 56 and 58, respectively, as shown in FIGURE 2.

As brought out before, the disc 20 is a destination bearing disc which is of transparent red material having the thin radial clear area or slot 24. The disc 28 is a destination distance disc which is of transparent red material having the thin Archimedean spiral clear area or slot 32. The disc 22 is an aircraft bearing disc which is the same as the destination bearing disc 20, but made of transparent blue material and having the thin radial clear area or slot 26. The disc 30 is an aircraft distance disc, which is the same as the destination distance disc 28, but made of transparent blue material and having the thin Archimedean spiral clear area or slot 34.

Figure 11:
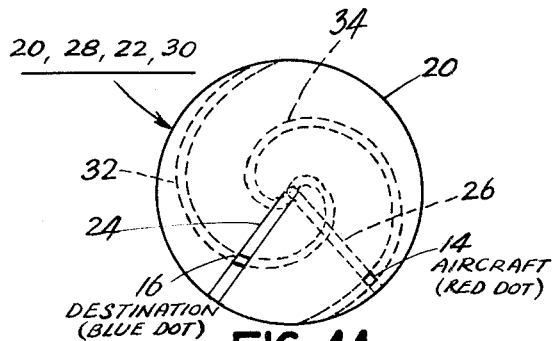
FIGURE 11 is the first disc, shown in FIGURE 3, overlaying the second, third, and fourth discs of FIGURES 4, 5 and 6 in accordance with the embodiment of the invention of FIGURE 1.
Figure 4:
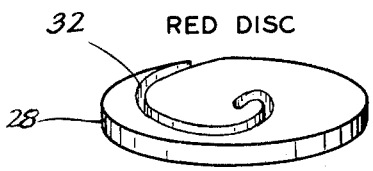
FIGURE 4 is a perspective view of a second disc of the display underlaying the first disc when used in the assembly of the pictorial display in producing the picture on the face of the device shown in FIGURE 1.
Figure 10:
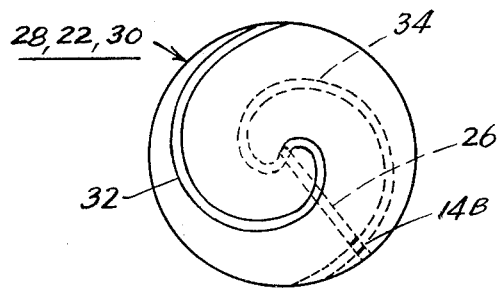
FIGURE 10 is a plan view of the second disc, shown in FIGURE 4, overlaying the third and fourth discs of FIGURES 5 and 6.
Figure 5:
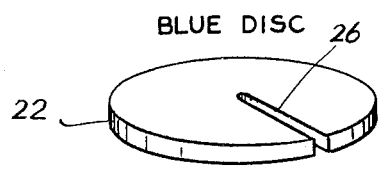
FIGURE 5 is a perspective view showing a third disc underlaying the first and second discs when used in the assembly of the pictorial display of FIGURE 1.
Figure 9:
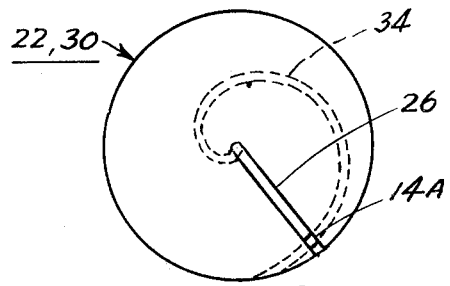
FIGURE 9 is a plan view of the third disc, shown in FIGURE 5, overlaying the fourth disc shown in FIGURE 6.
Figure 6:
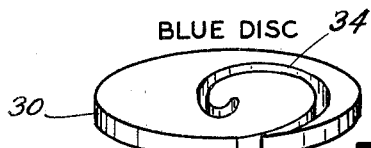
FIGURE 6 is a perspective view showing a fourth disc underlaying the first, second, and third discs when used in the assembly of the pictorial display of FIGURE 1.
Figure 8:
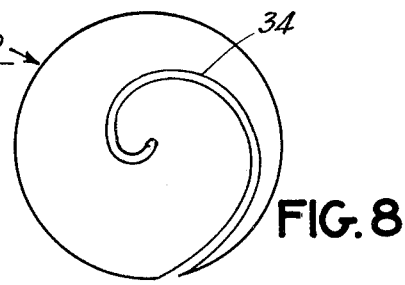
FIGURE 8 is a plan view of the fourth disc shown in FIGURE 6.
Figure 7:
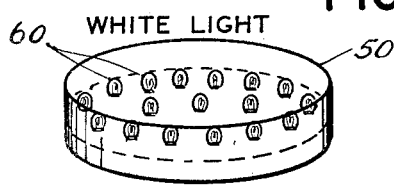
FIGURE 7 is an illuminating element of the pictorial display.

The white light emitted by the light source 50 first passes through the transparent aircraft distance disc 30 which functions as a blue filter and emerges as a blue light except at the Archimedean spiral clear area or slot 34 at which location the light appears as an unfiltered white light spiral line. The white light through the spiral slot 34 then passes through the transparent aircraft bearing disc 22 which also functions as a blue filter and emerges as a blue light except at the intersection of the spiral area 34 of the aricraft distance disc 30 and the radial area or slot 26 of the aircraft bearing disc 22. At this point the light comes through as an unfiltered white dot 14A, as shown in FIGURE 9. This white dot 14A passes through the destination distance disc 28 which functions as a red filter and emerges as red dot 14B, as shown in FIGURE 10, and then goes through the red destination bearing red disc 20 and appears as the red aircraft dot 14, as shown in FIGURE 11, which locates the red aircraft dot 14 in relation to the referenced VORTAC station 18 on the faceplate 12, as shown in FIGURE 1.

The overall blue light emitted by the aircraft bearing disc 22, functioning as a blue filter, passes through the Archimedean clear area 32 of the destination distance disc 28 and appears as a blue light spiral line. The blue light spiral line from the spiral 32 passes through an intersection of the spiral line 32 and the radial clear area 24 to appear as the destination blue dot 16, as shown in FIGURE 11, which locates the destination blue dot 16 in relation to the aircraft red dot 14 and the referenced VORTAC station 18 on the faceplate 12, as shown in FIGURE 1. Elsewhere the overall blue light is absorbed by the disc 20 which functions as a red filter and appears black.

Referring to FIGURE 2, the electrical and mechanical interconnections of the invention provides for the four actuating means or servo systems 52, 54, 56 and 58 having error detectors or closed loop error circuits 62, 64, 66 and 68, respectively.

As brought out before, the bearing and distance inputs for the aircraft red dot 14 come from the VOR receiver 36 and the DME receiver 38, respectively. Therefore, a bearing servo 70 of the VOR receiver 36 receiving information from the VORTAC station mechanically positions a rotor winding 71 of a resolver 71A in response thereto. The rotor winding 71 is energized from a suitable source of alternating current such as a 400 cycle 26 volt source and positioned by the servo 70 in variable inductive relation to stator windings of the resolver 71A of the VOR receiver 36. The stator windings of the resolver 71A are of a conventional type and electrically connected by four conductor lines 69 to corresponding stator windings of a resolver 71B, as shown in FIGURE 2. The stator windings of the resolver 71B are in turn inductively coupled to a rotor winding 73 connected by line 72 to the input of an amplifier 74 of the closed loop error circuit 62. In turn, the amplifier 74 has an output which is connected by line 76 so as to apply an electrical signal to control the direction and speed of rotation of a servomotor 78 which may be of a conventional type. The motor 78 is connected by mechanical means 80 to a gear train 82 which in turn is connected by mechanical means 84 to adjustably position the rotor winding 73 of the resolver 71B in a sense dependent upon the control signal applied by amplifier 74 to the motor 78 which in turn adjusts the rotor winding relative to the stator windings of the resolver 71B to null the control signal.

In addition, the servomotor 78 through the gear train 82 is connected by suitable mechanical means 85 so as to angularly position the radially slotted aircraft bearing blue disc 22, and by suitable mechanical means 86 to a mechanical differential 87. The mechanical differential 87 is connected by suitable mechanical means 88 so as to angularly position the spirally slotted aircraft distance blue disc 30.

In the operation of the servo system 52, the error between the resolver 71B and the resolver 71A of the VOR receiver 36 is fed into the amplifier 74 of the closed loop error circuit 62 and in turn controls the operation of the servomotor 78 so as to drive the gear train 82 to angularly position the rotor winding 73 of the resolver 71B to an angular position corresponding to that of the rotor winding 71 of the resolver 71A in the VOR receiver 36 and in a sense to null the error or control signal in a conventional manner.

The servomotor 78, through the influence of the resolver 71B, in turn angularly positions through the suitable mechanical means 85 the radially slotted aircraft bearing blue disc 22 and, in addition, influences the angular position of the spirally slotted aircraft distance blue disc 30 through the mechanical differential 87.

A distance servo 90 of the DME receiver 38 receiving information from the VORTAC station mechanically positions an adjustable arm 91 of a potentiometer 91A in response thereto. The potentiometer 91A is energized from a suitable source of alternating current such as a 400 cycles 26 volt source. The potentiometer 91A of the DME receiver 38 is of a conventional type and the adjustable arm 91 thereof is electrically connected by a conductor line 89 to apply an electrical signal to the output of a differential amplifier 94, as shown in FIGURE 2.

An adjustable arm 93 of a potentiometer 91B energized from a suitable source of alternating current, such as a 400 cycle 26 volt source, in turn is connected by line 92 so as to apply an electrical signal to another input of the differential amplifier 94 of the closed loop error circuit 64.

The amplifier 94 is in turn connected by an output line 96 so as to apply a control signal corresponding to a difference between said input signals to a servomotor 98 in a sense to control direction and speed of rotation of a conventional type servomotor 98 depending upon the sense and amplitude of the signal difference. The motor 98 is connected by mechanical means 100 to a gear train 102 which in turn is connected by mechanical means 104 to angularly position the arm 93 of the potentiometer 91B in a sense to null the differential control signal.

In addition, the servomotor 98 through the gear train 102 is connected by mechanical means 106 to the mechanical differential 87. The mechanical differential 87 is connected by mechanical output means 88 to the spirally slotted aircraft distance blue disc 30 so that the difference in mechanical adjustments imparted by the servomotor 78 and servomotor 98 through the mechanical differential 87 to the output means 88 causes the effective angular adjustment of the disc 30.

In the operation of the servo system 54, the electrical signals effected by the potentiometer 91B and the potentiometer 91A of the DME receiver 38 are fed to the inputs of the differential amplifier 94 of the closed loop error circuit 64 and the difference in said input signals is applied to the output line 96 to in turn operate the servomotor 98 to rotate the gear train 102 in a sense to position the adjustable arm 93 of the potentiometer 91B to an angular position corresponding to that of the adjustable arm 91 of the potentiometer 91A in the DME receiver 38 so as to in effect null the output signal applied at line 96. The servomotor 98, through the controlling influence of the potentiometers 91A and 91B, in turn angularly positions the spirally slotted aircraft distance blue disc 30 through the mechanical differential 87.

The bear and distance inputs for the destination blue dot 16 are supplied by a control head and a course line computer 40 including a course line computer bearing set transmitter 40A and a course line computer distance set 40B which act to transmit this information to the pictorial display. The course line computer bearing set transmitter 40A includes an operator-operative control 110, as shown in FIGURE 2 which may be set to angularly position a rotor winding 111 of a transmitter 111A. The rotor winding 111 of the transmitter 111A in turn is energized from a suitable source of alternating current such as a 400 cycle 26 volt source and positioned by the operator-operative control 110 in variable inductive relation to stator windings of the transmitter 111A of the course line computer 40A. The stator windings of the transmitter 111A are electrically connected in conventional manner by three conductor lines 109 to corresponding stator windings of a control transformer 111B. The stator windings of the transformer 111B are in turn inductively coupled to a rotor winding 113 connected by line 112 to an input of an amplifier 114 of a closed loop error circuit 66. In turn the amplifier 114 has an output which is connected by line 116 to control direction and speed of rotation of a servomotor 118 which may be of a conventional type.

The motor 118 is connected by mechanical means 120 to a gear train 122 which in turn is connected by mechanical means 124 to adjustably position the rotor winding 113 of the control transformer 111B in a sense dependent upon the electrical output signal from the amplifier 114 which in turn will be dependent upon the electrical input signal induced in the rotor winding 113.

In addition, the servomotor 118 through the gear train 122 is connected by mechanical means 125 so as to angularly position the radially slotted destination bearing red disc 20 and by mechanical means 126 to an input of a mechanical differential 127. The mechanical differential 127 is connected by mechanical means 128 so as to angularly position the spirally slotted destination distance red disc 28.

In the operation of the servosystem 56, the difference in angular position of the rotor winding 111 of the control transformer 111 and the angular position of the rotor winding 113 of the transmitter 111B of the course line computer 40A effects an electrical signal which is fed into an input of the amplifier 114 of the closed loop error circuit 66 which in turn effects an electrical output from the amplifier 114 applied through the conductor 116 acting in a sense to control the servomotor 118 in a conventional manner to cause rotation of the gear train 122 to angularly position the rotor winding 113 of the control transformer 111B to an angular position corresponding to that of the rotor winding 111 of the transmitter 111A in the course line computer 40A to effect a null signal at the input conductor 112 to the amplifier 114.

The servomotor 118, through the influence of the control transformer 111B in turn rotates the radially slotted destination bearing red disc 20 and, in addition, influences the rotation of the spirally slotted destination distance red disc 28 through the mechanical differential 127.

A distance set control 130 of the course line computer, designated as 40B in FIGURE 2, mechanically positions an adjustable arm 131 of a potentiometer 131A in response thereto. The potentiometer 131A is energized from a suitable source of alternating current such as a 400 cycle, 26 volt source. The potentiometer 131A of the course line computer 40B is of a conventional type and has the arm 131 thereof electrically connected by a conductor line 129 to an input of a differential amplifier 134, as shown in FIGURE 2. An adjustable arm 133 of a potentiometer 131B in turn is connected by a line 132 to another input of the differential amplifier 134 of the closed loop error circuit 68.

The differential amplifier 134 applies the difference between said input signals as an amplified output through a line 136 to control the direction and speed of rotation of a servomotor 138 which may be of a conventional type. The motor 138 is connected by mechanical means 140 to a gear train 142 which in turn is connected by mechanical means 144 to angularly adjust the positions of the arm 133 of the potentiometer 131B in a sense to follow the angular adjustment of arm 131 so as to adjust the arm 133 to an angular position corresponding thereto at which a null differential will be applied at conductor 136.

In addition, the servomotor 138 through the gear train 142 is connected by mechanical means 146 to the mechanical differential 127. The mechanical differential 127 is connected by mechanical means 128 so as to angularly adjust the spirally slotted destination distance disc 28 to a position corresponding to the difference in angular adjustment effected by servomotors 118 and 138.

In the operation of the servosystem 58, the error or difference between the angular position of the arm 133 of the potentiometer 131B and the angular position of the arm 131 of the potentiometer 131A of the course line computer 40B is applied as a controlling differential electrical signal at the output line 136 of the differential amplifier 134 of the closed loop error circuit 68. This differential signal in turn operates the servomotor 138 to control the direction and speed of rotation of the gear train 142 to angularly position the adjustable arm 133 of the potentiometer 131B to an angular position corresponding to the angular position of the adjustable arm 131 of the potentiometer 131A in the course line computer 40B. The servomotor 138, as thus controlled by the potentiometer 131A and the potentiometer 131B acting through the amplifier 134 in turn angularly positions the spirally slotted destination distance red disc 28 through the mechanical differential 127 as also influenced by the angular adjustment imparted through the mechanical differential 127 by the servomotor 118.

In the operation of the pictorial display, the bearing and distance inputs for the destination blue dot 16 are manually selected in the course line computer 40 by the operator effecting appropriate adjustment of the knobs 110 and 130 which transmits this information to the pictorial display. As noted in FIGURE 2, the course line computer bearing set transmitter 40A and the course line computer distance set potentiometer 40B are in the same package wherein the course line computer bearing set transmitter 40A feeds the control transformer 111B and the course line computer distance set potentiometer 40B feeds the pictorial display potentiometer 131B.

In summary therefore, this pictorial display system offers advantages over the hereinbefore displays in that the servosystem can rotate continuously precluding the need for limit stops, wires and pulleys and therefore in turn produces negligible backlash and thus providing for a simpler design permitting a much smaller package configuration.

I claim:

1. For use in an aircraft instrument including a visual display utilizing a control means for receiving signals indicative of a position of the aircraft in flight from a facility for transmitting such signals; the combination comprising a display plate, means including a pair of slotted discs operable by said control means for projecting on the display plate in response to said signals a beam of light indicative of the flight position of the aircraft in relation to the signal transmitting facility.

2. The combination defined by claim 1 including another pair of slotted discs, operator-operative means, the other pair of slotted discs being operable by the operator-operative means for projecting on the display plate another beam of light indicative of a position of a predetermined destination of the aircraft in relation to the signal transmitting facility.

3. For use in an aircraft instrument including a visual display utilizing a control means for receiving distance and bearing signals from a facility for transmitting such signals; the combination comprising a transparent display plate, an indicia on the display plate indicative of a position of the signal transmitting facility, a plurality of colored filter transparent discs, each disc having either a radially extending slot or an Archimedean spiraled slot, actuating means operated by said control means for angularly positioning a pair of said plurality of discs in relation one to the other so as to position the radially extending slot of one of said pair of discs relative to the Archimedean spiraled slot of another of said pair of discs in a varying intersecting relation dependent upon the distance and bearing signals received by said control means, and light projection means for presenting the intersection of the radial slot of the one of said discs with the Archimedean slot of the other of said discs as a light image on the display plate in a relation to said indicia indicative of the position of the aircraft in relation to the signal transmitting facility.

4. The combination defined by claim 3 including operator-operative means for angularly positioning another pair of said plurality of discs in relation one to the other so as to position the radially extending slot of one of said other pair of discs relative to the Archimedean spiraled slot of another of the discs of said other pair of discs in a varying intersecting relation dependent upon a predetermined destination of the aircraft, and said light projection means for presenting the intersection of the radial slot of the one disc of said other pair of discs with the Archimedean spiraled slot of the other disc of said other pair of discs as another light image on the display plate in a relation to said indicia indicative of the destination of the aircraft.

5. The combination defined by claim 3 wherein said plurality of discs includes a transparent colored filter aircraft bearing disc having a radial slot extending outwardly from the center thereof and a transparent colored filter aircraft distance disc having a slot extending in an Archimedean spiral from the center thereof, and said actuating means angularly positioning said aircraft distance disc relative to said aircraft bearing disc dependent upon the signals received from the signal transmitting facility and said projection means presenting the intersection of the radial slot of the aircraft bearing disc and the Archimedean slot of the aircraft distance disc as a colored mark on the display plate designating the location of the aircraft.

6. The combination defined by claim 4 wherein said plurality of discs includes a first transparent filter disc of one color having a radial slot extending outwardly from the center thereof and a second transparent filter disc of said one color having a slot extending in an Archimedean spiral from the center thereof, said actuating means to angularly position said first disc relative to said second disc so that the radial slot of the first disc may intersect the Archimedean spiral slot of the second disc at a point depending on information received from the signal transmitting facility, a third transparent filter disc of another and complementary color having a radial slot extending outwardly from the center thereof, and a fourth transparent filter disc of said other color having a slot extending in an Archimedean spiral from the center thereof, said operator-operative means to angularly position the third disc relative to said fourth disc so that the radial slot of the third disc may intersect the Archimedean spiral slot of the fourth slot at a point depending on a predetermined destination of the aircraft, said light projection means operably directing light rays through the intersection of the radial slot of the first disc and the Archimedean slot of the second disc and thereby through the filtered transparent disc of said other color of the third and fourth discs for presenting a first dot of said other color on the display plate to indicate the location of the aircraft, and said light projection means operably directing light rays through the first and second discs of said one color and thereby through the intersection of the radial slot of the third disc and the Archimedean slot of the fourth disc for presenting a second dot of said one color on the display plate to indicate the destination of the aircraft; thereby presenting, on the display plate by the first and second dots, the location of the aircraft in relation to the destination of the aircraft and to the indicia of the signal transmitting facility.

7. The combination defined by claim 3 wherein said actuating means further comprises a closed loop error circuit means interposed between said discs and said control means for sensing an error between a position of said discs and a position set by said control means, and means responsive to said error for realigning said discs until a null error position is effected.

8. The combination defined by claim 3 further comprising a closed loop error circuit means interposed between said discs and said control means for sensing an error between a position of said discs and said control means, means responsive to said error for realigning said discs until a null error position is effected, said error circuit means including a first resolver, said control means including a second resolver, means for amplifying the error signal between said first and said second resolvers, a motor operable through said amplifying means depending on a difference in adjusted position of said resolvers, a gear train connecting said motor to said first resolver to adjust said error signal to a null condition and for angularly positioning the radially extending slot of one of said discs relative to said Archimedean spiraled slot of another of said discs so as to present the intersection of said slots through a color filter for presenting on the display plate, in relation to said indicia, a light image of the color of said filter for indicating the position of the aircraft relative to the indicia of the signal transmitting facility.

9. The combination defined by claim 4 in which a first pair of said plurality of discs include a first transparent colored filter disc of one color having an Archimedean spiraled slot, a second transparent colored filter disc of said one color having a radial slot overlaying said first disc, and a second pair of said discs includes a third transparent colored filter disc of another and complementary color having an Archimedean spiraled slot overlaying said second disc, and a fourth transparent colored filter disc of said other color having a radial slot overlaying said third disc, said actuating means to angularly position said first and second discs in relation to each other dependent upon the signals received from the signal transmitting facility by said control means, the light projection means including a light source underlaying the first disc for directing light rays through the intersection of the radial slots of the second and fourth discs with the Archimedean spiraled slots of the first and third discs, and the transparent display plate being located at an opposite side of said discs from said light source for receiving an animated projection of light rays from said light source through said intersections and thereby presenting light images on said faceplate of said one color and said other color for indicating the position of the aircraft in relation to its destination and its bearing relative to the indicia of the signal transmitting facility.

10. The combination defined by claim 9 further comprising a bearing signal receiver including means within the control means for operably receiving aircraft bearing signals, a distance signal receiver including other means within the control means for operably receiving aircraft distance signals, said bearing signal receiver including first motor means for angularly positioning one disc of said first pair of discs, and said distance signal receiver including second motor means, and differential means operably connecting said first and second motor means for angularly positioning another disc of said first pair of discs relative to said one disc to present an animated movable light spot on said faceplate relative to the indicia of the signal transmitting facility for designating the location of the aircraft relative to the signal transmitting facility.

11. The combination defined by claim 10 wherein said control means includes a course line bearing set transmitter, a first variable control means operable by said course line bearing set transmitter, a course line distance set transmitter, a second variable control means operable by said course line distance set transmitter, third motor means controlled by the first variable control means for angularly positioning one disc of another pair of said discs, fourth motor means controlled by the second variable control means, and differential means operably connecting said third and fourth motor means for angularly positioning the other disc of said other pair of discs for presenting an animated movable light spot on said faceplate designating the location of a predetermined destination of the aircraft relative to the indicia of the signal transmitting facility.

12. The combination defined by claim 4 wherein said plurality of discs includes a first pair of adjacent transparent blue filter discs, one of said first pair of discs being an aircraft distance disc and the other of the said first pair of discs being an aircraft bearing disc, one of said first pair of discs having a slot extending in an Archimedean spiral from the center thereof and the other of said first pair of discs having a radial slot extending outwardly from the center thereof; a second pair of adjacent transparent red filter discs, one of said second pair of discs being a destination distance disc and the other of said second pair of discs being a destination bearing disc, one of said second pair of discs having a slot extending in an Archimedean spiral from the center thereof and the other of said second pair of discs having a radial slot extending outwardly from the center thereof; the light projection means being arranged at one side of the discs, the transparent display plate being positioned at an opposite side of said discs, and said light projection means being so arranged as to direct light rays through the discs and the intersections of the radial and spiral slots of the first and second pairs of discs so as to project red and blue light images on the display plate in a visual display indicating by one of said light images the position of the aircraft and by the other of said light images the destination of the aircraft in relation to the signal transmitting facility as indicated by the indicia on the display plate.

13. For use in an aircraft instrument including a visual display utilizing a control means for receiving signals indicative of a position of the aircraft in flight from a facility for transmitting such signals; the combination comprising a transparent display plate, an indicia on the display plate indicative of a position of the signal transmitting facility, a plurality of discs, each disc having either a radially extending slot or an Archimedean spiraled slot, actuating means operated by said control means for angularly positioning a pair of said plurality of discs in relation one to the other so as to position the radially extending slot of one of said pair of discs relative to the Achimedean spiraled slot of another of said pair of discs in a varying intersecting relation dependent upon the aircraft position indicative signals received by said control means, light projection means for presenting the intersection of the radial slot of the one of said discs with the Archimedean slot of the other of said discs as a light image on the display plate in a relation to said indicia indicative of the position of the aircraft in relation to the signal transmitting facility.

14. The combination defined by claim 13 including operator-operative means for angularly positioning another pair of said plurality of discs in relation one to the other so as to position the radially extending slot of one of said other pair of discs relative to the Archimedean spiraled slot of another of the discs of said other pair of discs in a varying intersecting relation dependent upon a predetermined destination of the aircraft, and said light projection means for presenting the intersection of the radial slot of the one disc of said other pair of discs with the Archimedean spiraled slot of the other disc of said other pair of discs as another light image on the display plate in a relation to said indicia indicative of the destination of the aircraft.

15. The combination defined by claim 13 wherein said plurality of discs includes actuating means for angularly positioning one of said pair of discs in response to a signal received by the control means from the signal transmitting facility indicative of a position condition of the aircraft, and said actuating means angularly positioning the other of said pair of discs in response to a signal received by said control means from the signal transmitting facility indicative of another position condition of said aircraft, and said projection means presenting the intersection of the radial slot and the Archimedean slot of said pair of discs as a mark on the display plate designating the location of the aircraft dependent upon the position conditions indicated by said signals.

References Cited
UNITED STATES PATENTS 2,528,142 10/1950 Herzlinger.
3,059,233 10/1962 Guarino et al. ____ 340—27 XR
3,400,364 9/1968 Musgrave et al. _____ 340—24

ALVIN H. WARING, Primary Examiner

U.S. Cl. X.R.

235—150.27; 343—106